United States Patent [19]
Jacobsen

[11] Patent Number: 5,415,578
[45] Date of Patent: May 16, 1995

[54] GAME CALL APPARATUS

[75] Inventor: Rockie L. Jacobsen, Orofino, Id.

[73] Assignee: Primos, Inc., Jackson, Miss.

[21] Appl. No.: 274,964

[22] Filed: Jul. 14, 1994

[51] Int. Cl.$^6$ ............................................. A63H 5/00
[52] U.S. Cl. ..................................... 446/207; 446/397
[58] Field of Search ............... 446/207, 208, 202, 203, 446/204, 206, 126, 397; 84/383 R, 383 A

[56] References Cited

U.S. PATENT DOCUMENTS

| | | | |
|---|---|---|---|
| 1,052,525 | 2/1913 | Smith | 446/208 |
| 4,752,270 | 6/1988 | Morton | 446/207 |
| 4,897,067 | 1/1990 | Piper | 446/207 |
| 4,976,648 | 12/1990 | Meline . | |
| 5,061,220 | 10/1991 | Cooper | 446/208 |
| 5,122,088 | 6/1992 | Meline . | |

Primary Examiner—Robert A. Hafer
Assistant Examiner—D. Neal Muir
Attorney, Agent, or Firm—Foster & Foster; L. Grant Foster

[57] ABSTRACT

A game call in the form of a diaphragm call includes an upwardly extending shelf which extends over a substantial portion of the latex membrane. The shelf provides a constant distance above the latex membrane to render the call easier to use and prevent the caller from damaging the latex membrane from upward pressure by the tongue. The shelf may be adjusted to vary the distance between the shelf and top surface of the latex membrane.

19 Claims, 4 Drawing Sheets

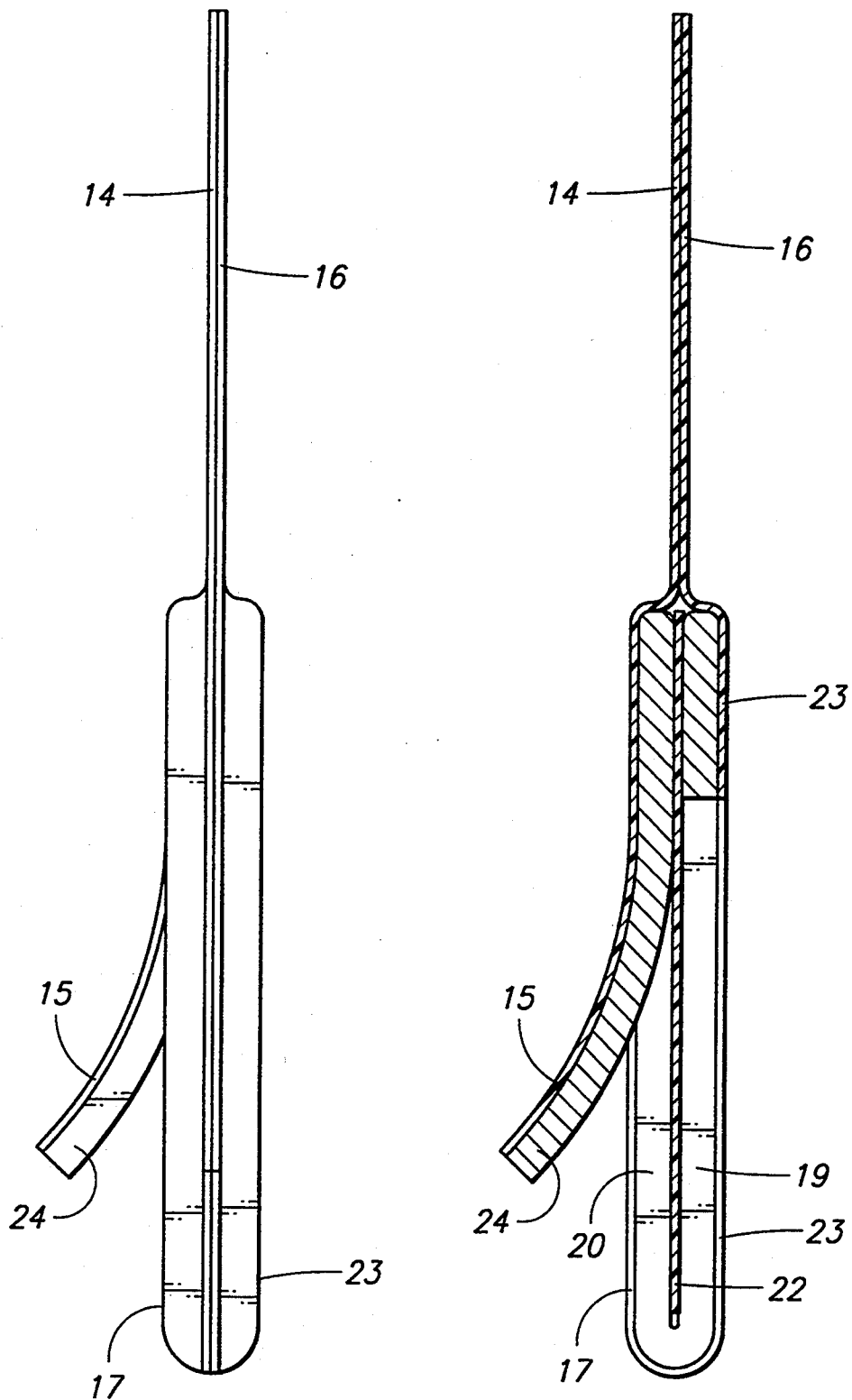

GAME CALL APPARATUS

TECHNICAL FIELD

This invention relates to game calls for simulating the sound of game animals.

BACKGROUND OF THE INVENTION

Many game calls have been developed over the years for the purpose of simulating vocalizations made by particular types of animals. Game calls are used by hunters, photographers, wildlife watchers, and many other outdoor enthusiasts. With respect to all game calls, continual efforts are made to more closely replicate the actual sound of the particular animal.

Virtually all game calls require skill for effective use. Some calls are highly difficult to use and require hours of practice before a person can master the call. Often, a particular game call simply cannot be mastered by a segment of users because of the difficulties presented by call.

One example of a difficult-to-master game call is a reed-type diaphragm call commonly used for calling turkeys and elk, but also used for calling other animals. The diaphragm call fits completely into a person's mouth. A peripheral, flexible edge extending from the diaphragm call on three sides must seal against the roof of the caller's mouth. The side of the diaphragm call that does not include the edge includes a free end of a latex membrane stretched between a frame in the diaphragm call. The free end of the latex membrane is pointed toward the opening of the caller's mouth. The caller is required to keep the diaphragm in place by using his or her tongue, while forcing a certain amount of air to travel through approximately a ⅛ inch gap between the caller's tongue and the latex membrane. Vibration of the membrane emits a sound intended to replicate a particular animal. The tongue pressure applied to the latex membrane and the distance between the latex membrane and the roof of the caller's mouth will affect the tone of the sound produced by the call. This type of call is difficult to master because the call must seal properly within the mouth, proper tongue pressure must be applied to the latex membrane, a proper gap between the tongue and the membrane must be established, and the proper distance between the membrane and the roof of the person's mouth must be maintained.

Still other problems exist with respect to diaphragm calls. For example, such calls are typically built in a single size. Since the arc of a person's palate usually differs from one person to another, a one-size diaphragm call is often unsuitable for a particular caller. For such callers, a traditional diaphragm call must be moved either backward or forward in the person's mouth to position the call so that the distance between the roof of the mouth and the latex membrane is optimal. Often, the call must be positioned far back in the caller's mouth to create the proper fit, which may cause the caller to gag or choke.

Another problem with respect to traditional diaphragm game calls is that the latex membrane can easily be stretched beyond its modulus of elasticity so that permanent deformation occurs, or the diaphragm is pulled from the frame that holds the latex membrane in tension. Still another problem with respect to traditional diaphragm calls is that there is no way to adjust the call structurally to vary the sounds emitted from the call. Typically, the only way to change the sound is to move the call inside the mouth and/or change the pressure exerted by the tongue.

There is a need, therefore, to provide a game call that is easier to use as compared to traditional game calls. There is further a need to provide a diaphragm game call that removes one of the many variables the caller is required to master in order to effectively use the game call. There is also a need to develop a diaphragm call that prevents the latex membrane from being deformed beyond a point where permanent deformation occurs. There is still another need for a diaphragm game call that can be adjusted structurally to vary the sound emitted from the game call.

The present invention involves a diaphragm game call that includes a shelf projecting above the latex membrane of the game call to create a fixed distance between the surface of the latex and the extending shelf. Traditionally, this distance has been created between the roof of the person's mouth using the game call and the latex membrane, which will vary depending upon the caller and other factors. The shelf defines a constant distance or gap between the latex membrane and the shelf to make the call easier to use and produce sounds that are easy to replicate. The protruding shelf also prevents the latex from being pushed upwardly by the tongue beyond its modulus of elasticity to prevent permanent deformation of the latex membrane. The shelf may also be adjusted to vary the distance between the latex membrane and the shelf. Other advantages, features, and objects of the invention will become apparent from the detailed disclosure which follows.

BRIEF DESCRIPTION OF THE DRAWINGS

Preferred embodiments of the invention are described below with reference to the accompanying drawings, which are briefly described below.

FIG. 6 is a side elevation view of the game call apparatus of FIG. 1;

FIG. 7 is a sectional side elevation view, taken along the lines 7—7 of FIG. 4, of the game call apparatus of FIG. 1.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
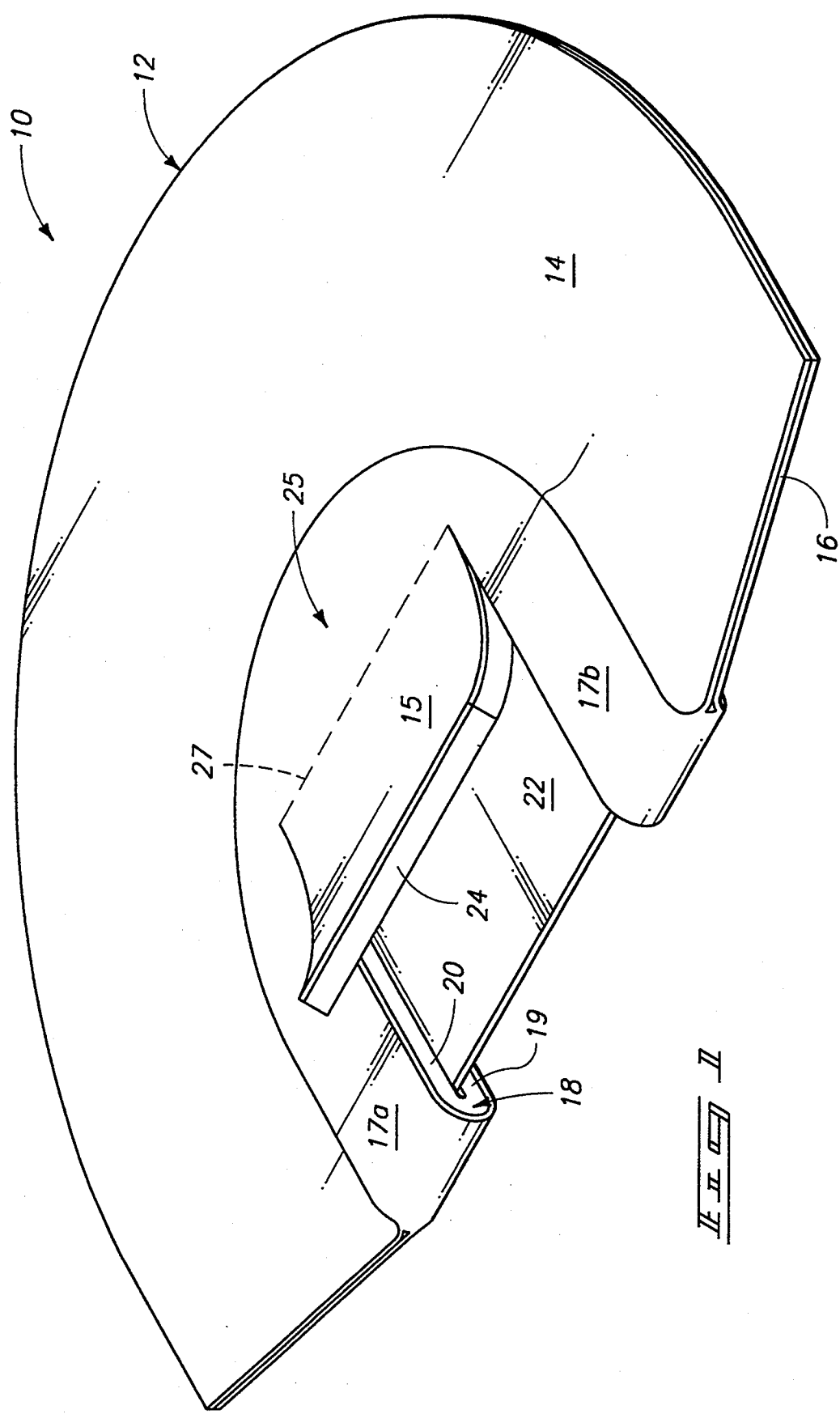
FIG. 1 is a perspective view of a game call apparatus according to the present invention.

FIG. 1 shows an animal game call 10 in the form of a diaphragm call. The diaphragm call 10 is intended to be placed completely within the mouth of the person using the call. The diaphragm call 10 includes a peripheral, flexible, moldable edge 12, which may comprise a reenforced plastic or fabric material. In one embodiment, the flexible, moldable material comprises reenforced adhesive-backed tape which is folded over onto itself to create a top side 14 and a bottom side 16 with the two sides being joined and secured in place at the respective adhesive-backed sides.

The diaphragm call 10 further comprises a rigid frame 18 which is generally in the form of a U-shaped member. In one embodiment, the frame member 18 is formed by folding an oval-shaped piece of material, such as aluminum, back onto itself to form a bottom frame half 19 and a top frame half 20. The bottom frame 19 and the top frame 20 are combined to form opposed frame sides 17a, 17b which generally define the frame width.

A membrane 22, preferably in the form of a latex membrane, is secured between the first frame side 17a and the second frame side 17b. The latex membrane 22 is held within the frame 18 so that the membrane 22 is under tension. When under the proper amount of tension, the latex membrane 22 will vibrate when air is forced across one side of the membrane surface to produce a sound. The frame 18 further includes an apex area 25 where the frame sides 17a and 17b join at the U-shaped area of the frame.

A shelf 24, in the form of an extending flange, integrally extends from the frame 18 generally at the apex location 25. The shelf 24 extends in an arcing upward manner. The shelf or plate 24 extends upward from the apex location at an angle relative to the membrane 22. As shown in FIGS. 1, 4, 6, and 7, the shelf 24 extends over approximately ⅔ of the area of the latex membrane 22. As can be seen, the shelf 24 has a shelf width that corresponds substantially to the frame width defined by opposed frame members 17a, 17b.

Figure 2:
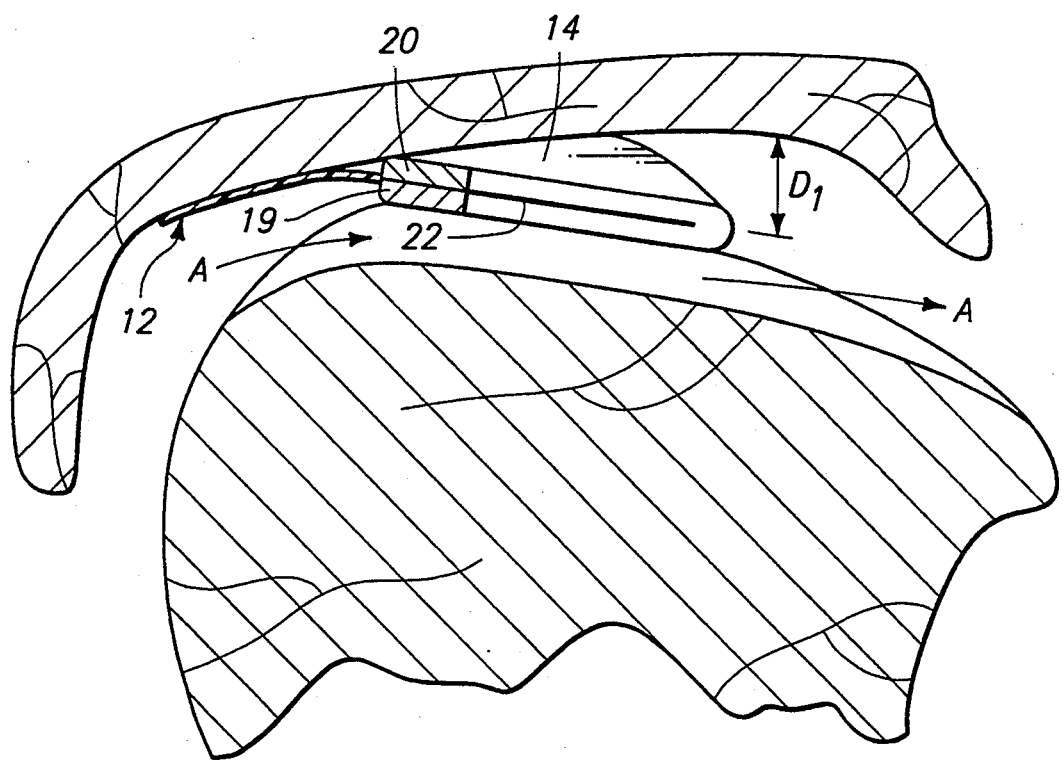
FIG. 2 is a prior art diaphragm game call inside a person's mouth.

FIG. 2 shows a prior art diaphragm call, which of course does not include any upwardly extending shelf 24 as in the present invention. The prior art diaphragm call includes a peripheral, flexible piece of edge material 14 intended to be sealed against the roof of the caller's mouth. The tongue of the caller urges the diaphragm call against the roof of the mouth to create a distance $D_1$ which, in part, determines the pitch of the sound made by the call when air A is forced across the latex membrane 22. The gap for airflow between the person's tongue and the latex membrane must be maintained at approximately ⅛ of an inch. Since the tongue must be used to force the diaphragm upward against the roof of the caller's mouth, the air channel through which air A is forced usually corresponds to the mid-portion of the person's tongue, with the sides of the tongue forcing the diaphragm upward. Since the palate of a given caller will vary depending upon the physiological makeup of the person's mouth, the specific location of the diaphragm call (i.e., the forward/backward position of the call) must vary to ensure that the distance $D_1$ remains optimal for emitting the proper sound and to seal the flexible edge of the diaphragm call against the palate.

Figure 3:
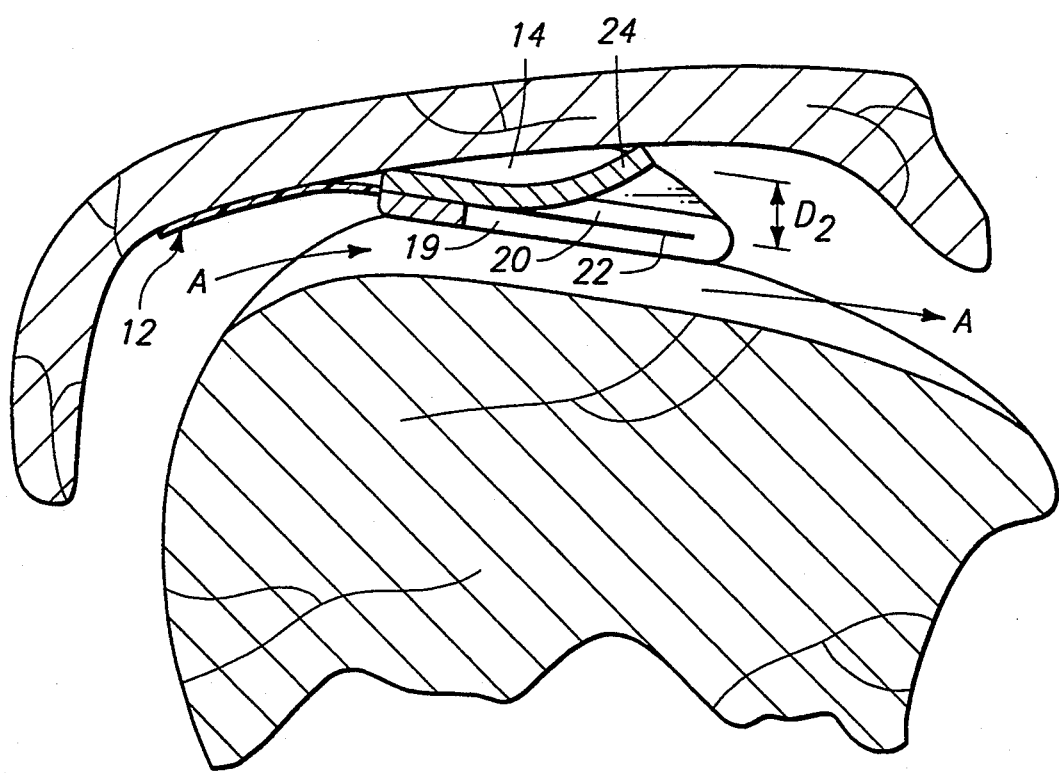
FIG. 3 is a sectional side elevation view of the game call apparatus of FIG. 1 inside a person's mouth.
Figure 4:
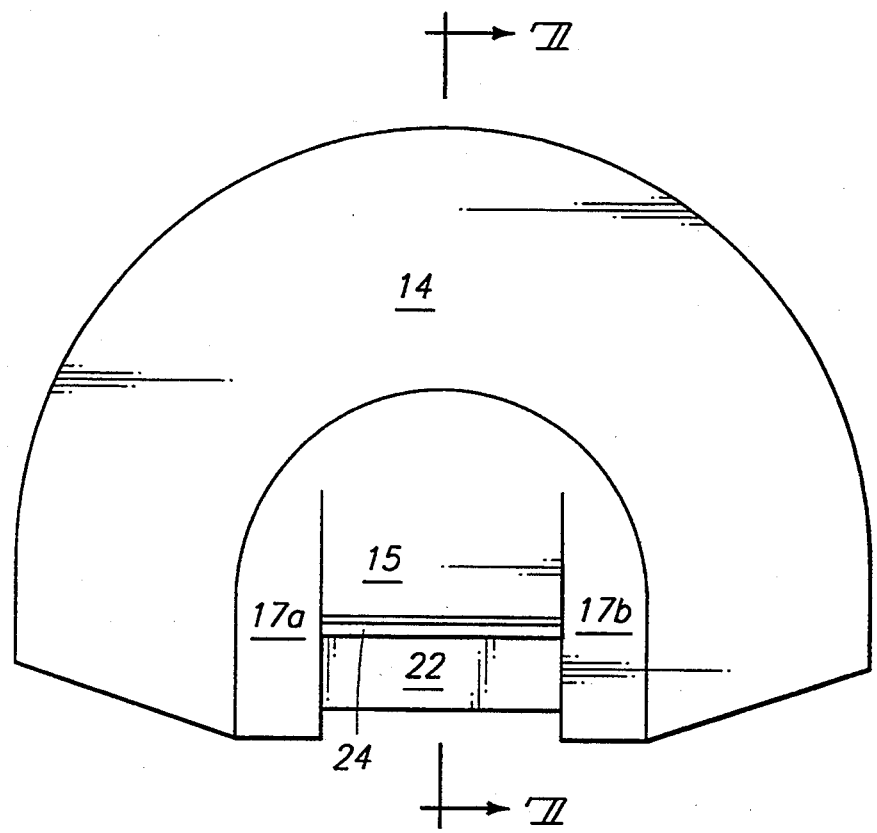
FIG. 4 is a top view of the game call apparatus of FIG. 1.
Figure 5:
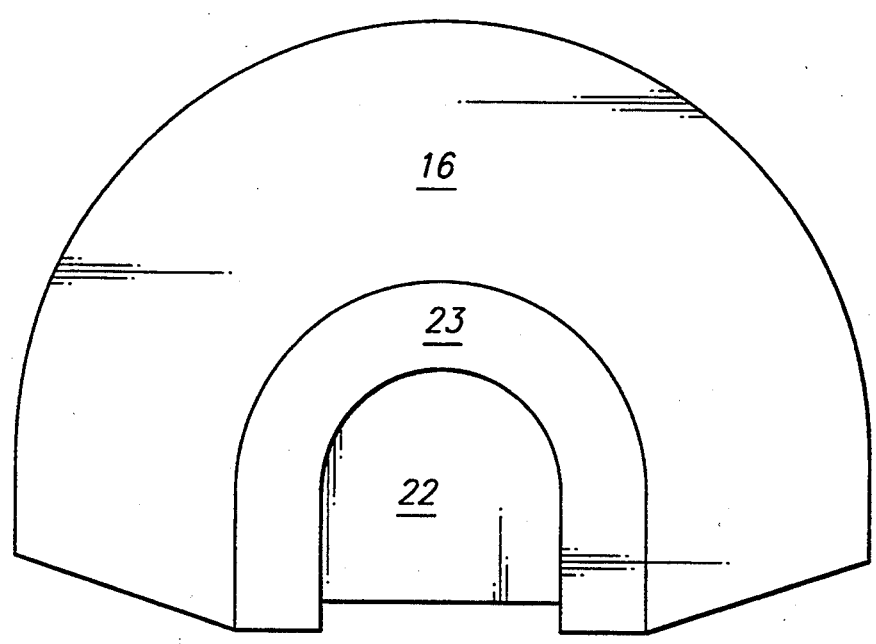
FIG. 5 is a bottom view of the game call apparatus of FIG. 1.

In comparison, the diaphragm call of the present invention, as shown in FIG. 3, includes an integral, upwardly arcing and extending flange 24 which defines a distance $D_2$. This distance remains constant unless the structure of the call is changed. As discussed above, the distance $D_2$ is one of the variables which affects the pitch of the sound emitted by the caller when air A is forced across the latex membrane. Accordingly, the backward/forward orientation of the diaphragm call will not affect the pitch of the sound emitted when air A is forced across the latex membrane 22. Therefore, relative to the roof of a person's mouth, the only variable that must be compensated for is that the peripheral flange 12 be sealed against the roof of the mouth so that air does not pass over the top of the game call. Regarding sound pitch, tongue pressure on the latex diaphragm becomes the primary variable.

As shown in FIG. 1, the shelf 24 may be made of aluminum, which enables the shelf 24 to be bent and pivoted along pivot line 27 to vary the distance between the top surface of the latex membrane and the shelf 24. The shelf or plate 24 is malleable and adjustable to vary the angle relative to the membrane 22. This enables the caller to more easily adjust the pitch of the sound emitted from the diaphragm call 10.

The flange 24 is also beneficial in that it prevents the caller from putting excess upward pressure on the latex membrane 22 which may otherwise exceed the modulus of elasticity of the latex member and result in permanent deformation. The shelf 24 acts essentially as a barrier beyond which the latex membrane 22 cannot be forced.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A game call for use inside a person's mouth, comprising:
   a U-shaped frame;
   a yieldable reed spanning across the U-shaped frame;
   a first roof-of-mouth engaging flexible peripheral sealing portion carried by the frame;
   a second roof-of-mouth engaging portion extending at an angle upwardly from the frame, the second portion being spaced away from the first portion said second engaging portion defining a space above the yieldable reed permitting reed vibration, the first and second portions defining a predetermined orientation of the U-shaped frame inside the mouth relative to the roof of mouth.

2. A game call apparatus to be completely inserted inside a person's mouth for calling game, comprising:
   a frame;
   a membrane of material stretched over the frame;
   a flexible and moldable peripheral edge extending outwardly from the frame; and
   a plate having a length, the plate extending generally upward from the frame and over a portion of the membrane, the plate being differentially spaced above the portion of the membrane at various locations along the length of the plate.

3. A game call according to claim 2 wherein the frame is generally U-shaped and includes an apex location, the plate extending generally upward from the apex location.

4. A game call according to claim 2 wherein the frame is generally U-shaped and includes an apex location, the plate extending upward from the apex location at an angle relative to the membrane.

5. A game call according to claim 4 wherein the plate is adjustable to vary the angle relative to the membrane.

6. A game call according to claim 2 wherein the plate extends over the membrane to create a distance between the plate and the membrane, the position of the plate being adjustable to vary the distance between the plate and the membrane.

7. A game call according to claim 2 wherein the plate extends over the membrane to create a distance between the plate and the membrane, the frame being generally U-shaped and including an apex location, the plate being malleable and bendable about the apex location to vary the distance between the plate and the membrane.

8. A game call according to claim 2 wherein the portion of the membrane over which the plate extends is approximately three-fourths of the membrane.

9. A game call according to claim 2 wherein the frame is generally U-shaped and includes an apex location, the plate extending and arcing upwardly from the apex location.

10. A game call according to claim 2 wherein the plate includes a top surface, and further comprising a top layer of material disposed on the top surface of the plate.

11. A game call according to claim 2 wherein the frame includes opposed frame members, the frame members defining a frame width in which the membrane is held, the plate having a plate width which is approximately equal to the frame width.

12. A game call according to claim 2 wherein the plate extends integrally from the frame, the plate extending from the frame in an arcing upward manner to extend over and above the portion of the membrane.

13. A game call according to claim 2 wherein the differentially spaced plate provides an optimal distance between the plate and the portion of the membrane to emit a desired sound.

14. A game call according to claim 4 wherein the angle is an acute angle.

15. A game call apparatus to be completely inserted inside a person's mouth for calling game, comprising:
- a generally U-shaped frame including opposed frame members, the frame members defining a frame width and opening, the frame including an apex location;
- a membrane of material securely held between the frame members;
- a flexible and moldable peripheral edge extending outwardly from the frame members; and
- a plate having a length and a plate width, the plate extending and arcing generally upward from the apex location of the frame and extending over a portion of the membrane, the plate extending upward from the apex location at an angle relative to the membrane, the plate being differentially spaced above the portion of the membrane at various locations along the length of the plate, the plate width being approximately equal to the frame opening width.

16. A game call according to claim 15 wherein the plate is malleable and bendable about the apex location to vary the distance between the plate and the membrane.

17. A game call according to claim 15 wherein the portion of the membrane over which the plate extends is approximately three-fourths of the membrane.

18. A game call according to claim 15 wherein the plate includes a top surface, and further comprising a top layer of material disposed on the top surface of the plate.

19. A game call according to claim 15 wherein the angle is an acute angle.

* * * * *